US011872962B2

(12) United States Patent
Maerkle et al.

(10) Patent No.: US 11,872,962 B2
(45) Date of Patent: Jan. 16, 2024

(54) WINDSCREEN WIPER DEVICE AND WINDSCREEN WIPER HAVING A WINDSCREEN WIPER DEVICE

(71) Applicant: Robert Bosch GmbH, Stuttgart (DE)

(72) Inventors: Jens Maerkle, Buehl (DE); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 17/635,360

(22) PCT Filed: May 29, 2020

(86) PCT No.: PCT/EP2020/064961
§ 371 (c)(1),
(2) Date: Feb. 14, 2022

(87) PCT Pub. No.: WO2021/028089
PCT Pub. Date: Feb. 18, 2021

(65) Prior Publication Data
US 2022/0274564 A1    Sep. 1, 2022

(30) Foreign Application Priority Data
Aug. 15, 2019   (DE) ...................... 10 2019 212 251.5

(51) Int. Cl.
*B60S 1/38*    (2006.01)
*B60S 1/40*    (2006.01)

(52) U.S. Cl.
CPC ............. *B60S 1/407* (2013.01); *B60S 1/3805* (2013.01)

(58) Field of Classification Search
CPC ............... B60S 1/407; B60S 1/38; B60S 1/40
See application file for complete search history.

(56) References Cited

U.S. PATENT DOCUMENTS

2006/0130263 A1*  6/2006  Coughlin .................. B60S 1/40
                                                          15/250.31
2012/0167326 A1*  7/2012  Egner-Walter ........ B60S 1/3805
                                                          15/250.32

(Continued)

FOREIGN PATENT DOCUMENTS

| DE | 112011102653 T5 | 8/2013 |
| DE | 102018212057 A1 | 1/2020 |
| WO | 2010034447 A1 | 4/2010 |

OTHER PUBLICATIONS

Translation of International Search Report for Application No. PCT/EP2020/064961 dated Aug. 6, 2020 (2 pages).

*Primary Examiner* — Michael D Jennings
(74) *Attorney, Agent, or Firm* — Michael Best & Friedrich LLP (57) ABSTRACT

The invention relates to a windscreen wiper device having: at least one wiper blade adapter (32*a*; 32*b*); at least one wiper arm adapter (30*a*; 30*b*); and at least one electric connection unit (38*a*; 38*b*) for electrically connecting at least one line element (34*a*; 34*b*) of the wiper arm adapter (30*a*; 30*b*) to at least one electric attachment element (40*a*; 40*b*) of the wiper blade adapter (32*a*; 32*b*), wherein the wiper blade adapter (32*a*; 32*b*) is mounted on the wiper arm adapter (30*a*; 30*b*) via at least one bearing element (36*a*; 36*b*), in particular a bearing pin, of the wiper arm adapter (30*a*; 30*b*) so as to be movable, in particular pivotable. According to the invention, the electric connection unit (38*a*; 38*b*) comprises at least one electric connection element (42*a*; 42*b*), which is arranged on the wiper arm adapter (30*a*; 30*b*) and is mounted via the bearing element (36*a*; 36*b*) so as to be moveable, in particular rotatable or pivotable, at least relative to the wiper arm adapter (30*a*; 30*b*).

17 Claims, 4 Drawing Sheets

(56) References Cited

U.S. PATENT DOCUMENTS

| | | | |
|---|---|---|---|
| 2014/0026348 A1* | 1/2014 | Schaeuble | B60S 1/4003 |
| | | | 15/250.32 |
| 2015/0013092 A1* | 1/2015 | Caillot | B60S 1/3805 |
| | | | 219/535 |
| 2015/0239435 A1* | 8/2015 | Caillot | B60S 1/3805 |
| | | | 15/250.07 |
| 2017/0203732 A1* | 7/2017 | Jomard | B60S 1/3894 |
| 2017/0297534 A1* | 10/2017 | Caillot | B60S 1/38 |

* cited by examiner

WINDSCREEN WIPER DEVICE AND WINDSCREEN WIPER HAVING A WINDSCREEN WIPER DEVICE

BACKGROUND OF THE INVENTION

A windshield wiper device having at least one wiper blade adapter, having at least one wiper arm adapter and having at least one electric connecting unit for electrically connecting at least one line element of the wiper arm adapter to at least one electric attachment element of the wiper blade adapter has already been proposed, wherein the wiper blade adapter is mounted movably on the wiper arm adapter via at least one bearing element of the wiper arm adapter.

SUMMARY OF THE INVENTION

The invention is based on a windshield wiper device having at least one wiper blade adapter, having at least one wiper arm adapter and having at least one electric connecting unit for electrically connecting at least one line element of the wiper arm adapter to at least one electric attachment element of the wiper arm adapter, wherein the wiper blade adapter is mounted movably, in particular pivotably, on the wiper arm adapter via at least one bearing element, in particular a bearing bolt, of the wiper arm adapter.

It is proposed that the electric connecting unit comprises at least one electric connecting element which is arranged on the wiper arm adapter and is mounted via the bearing element so as to be movable, in particular rotatable or pivotable, at least relative to the wiper arm adapter. The electric connecting element is preferably designed as part of an electric plug connection of the windshield wiper device. In particular, the electric attachment element of the wiper blade adapter is designed as part of the electric plug connection. For example, the electric connecting element and/or the electric attachment element are/is designed as a plug, as a coil and/or as an electrical contact. In particular in an embodiment of the electric connecting element and of the electric attachment element as coils, it is conceivable for an electrical connection via the electric connecting unit to take place inductively. The electric connecting element and the electric attachment element are preferably designed in a manner corresponding to each other. In particular, the electric connecting element is designed as a female connecting element of the electric plug connection and the electric attachment element is designed as a male connecting element of the electric plug connection. The electric attachment element preferably has at least one attachment pin in at least one region. The electric connecting element preferably has at least one attachment socket in at least one region. However, it is also conceivable for the electric connecting element to have at least one attachment pin and/or to be designed as a male connecting element of the electric plug connection and for the electric attachment element to have at least one attachment socket and/or to be designed as a female connecting element of the electric plug connection. Alternatively or additionally, it is conceivable for the electric connecting element and/or the electric attachment element at least partially, in particular in at least one contact region of the electric connecting element and/or of the electric attachment element, to have an embodiment which is known to a person skilled in the art. In particular, the electric plug connection and/or the electric connecting unit are/is provided to connect at least one electric unit, in particular a heating unit, of a windshield wiper, which electric unit is in particular at least partially arranged in a wiper blade, to an energy storage unit, in particular a battery, of the windshield wiper, preferably via the line element of the wiper arm adapter. In a coupled state of the electric attachment element and of the electric connecting element, the electric plug connection is preferably provided to connect at least one electric unit, in particular a heating unit, of a windshield wiper, which electric unit is in particular at least partially arranged in a wiper blade, to an energy storage unit, in particular a battery, of the windshield wiper, preferably via the line element of the wiper arm adapter. The electric attachment element is preferably connected at least electrically to the electric unit. The electric connecting element and/or the electric attachment element are/is preferably of two-pole design. The line element is preferably connected at least electrically to the electric connecting element, in particular to the attachment socket. In at least one connected state of the electric connecting unit, the electric connecting element and the electric attachment element are preferably connected at least electrically to each other. In at least one unconnected state of the electric connecting unit, the electric connecting element and the electric attachment element are preferably arranged separated at least electrically and/or spaced apart from each other. The electric connecting element and/or the electric attachment element, in particular in a region of the electric connecting element and/or the electric attachment element that is spaced apart from an electrical contact, are/is preferably formed at least partially, in particular at least largely, from a plastic, in particular a hard plastic. In at least one connected state of the electric connecting unit, the electric connecting element and the electric attachment element are preferably at least fastened to each other, in particular at least largely, via a force-fitting connection. The electric connecting element and/or the electric attachment element are/is preferably formed in at least one region at least partially as a plug collar which, in the connected state of the electric connecting unit, lies in a form-fitting manner on the electric attachment element and/or the electric connecting element. When the electric connecting element is connected to the electric attachment element, the plug collar is provided in particular to be at least partially pushed onto the electric connecting element and/or the electric attachment element or to be pushed into a connecting recess delimited by the electric connecting element and/or the electric attachment element. However, it is also conceivable for the electric connecting unit to comprise at least one securing element which is provided to secure the electric connecting element on the electric attachment element via a form-fitting and/or force-fitting connection, in at least one connected state of the electric connecting unit. In particular, the securing element is arranged on the electric connecting element or on the electric attachment element, in particular is formed integrally with the electric connecting element or the electric attachment element. "Integrally" is intended to be understood as meaning in particular connected in an integrally bonded manner, for example by a welding process and/or adhesive bonding process, etc., and particularly advantageously molded on, such as by the production from a casting and/or by the production in a single- or multi-component injection molding process. It is conceivable for the securing element to be designed, for example, at least partially as a latching element, as part of a screw or plug-in connection, as part of a bayonet closure, as a securing bolt or the like.

The bearing element preferably has at least one bearing axis about which the wiper blade adapter is mounted on the wiper arm adapter. The electric connecting element is preferably mounted via the bearing element so as to be rotatable or pivotable about the bearing axis. It is also conceivable for the electric connecting element, in particular in at least one unconnected state, of the electric connecting unit, to be mounted movably along the bearing axis. The bearing axis and/or the bearing element are/is particularly preferably oriented at least substantially perpendicularly to a main axis of extent of the wiper arm adapter. "Substantially perpendicularly" is intended to be understood as meaning in particular an orientation of a straight line or of a plane, in particular of the bearing axis and/or a main axis of extent of the bearing element, relative to a further straight line or a further plane, in particular the main axis of extent of the wiper arm adapter, wherein the straight line or the plane and the further straight line or the further plane, in particular as viewed in a plane of projection, enclose an angle of 90°, and the angle has a maximum deviation of in particular less than 8°, advantageously less than 5° and particularly advantageously less than 2°. A "main axis of extent" of a component, in particular of the wiper arm adapter and/or of the bearing element, is intended to be understood here as meaning in particular an axis which runs parallel to a longest edge of a smallest geometrical cuboid which only just completely surrounds the component. In particular, the bearing element is fastened, in particular for conjoint rotation, to a basic body of the wiper arm adapter. The electric connecting element is preferably mounted via the bearing element so as to be movable, in particular rotatable or pivotable, relative to the basic body of the wiper arm adapter. The bearing element is preferably arranged in such a manner that the bearing axis, in particular in at least one mounted state of the wiper blade adapter on the wiper arm adapter, is oriented at least substantially perpendicularly to a main axis of extent of the wiper blade adapter.

The wiper arm adapter preferably comprises at least one retaining element for retaining the wiper blade adapter on the wiper arm adapter, in particular on the bearing element. In particular, the retaining element is provided to retain the wiper blade adapter in at least one position relative to the wiper arm adapter along the bearing axis. The retaining element is preferably provided to at least partially limit a movement of the wiper blade adapter about the bearing element, in particular in at least one direction about the bearing axis. In particular, the retaining element is fastened to the basic body of the wiper arm adapter, in particular is formed integrally with the basic body of the wiper arm adapter. In particular in at least one unconnected state of the electric connecting unit, the electric connecting element is preferably mounted movably, in particular rotatably or pivotably, relative to the wiper arm adapter along or about the bearing element independently of the retaining element. In particular, the electric connecting element is arranged spaced apart from the bearing element. However, it is also conceivable for the electric connecting element to be arranged movably, in particular rotatably or pivotably, on the bearing element. In at least one connected state of the electric connecting unit, the electric connecting element is preferentially coupled via the electric attachment element to a movement of the wiper blade adapter about the bearing axis. In particular, the electric attachment element is fastened to a basic body of the wiper blade adapter for conjoint rotation.

By means of the embodiment according to the invention of the windshield wiper device, an advantageously secure electrical connection of the wiper blade adapter to the wiper arm adapter can be permitted, in particular since the electric connecting element can be moved together with the wiper blade adapter during a movement of the wiper blade adapter, in particular of the electric attachment element, about the bearing axis. It is advantageously possible to prevent an unintentional and/or inadvertent release of the electric connecting unit, in particular of the electric connecting element, from the electric attachment element, during a movement of the wiper blade adapter about the bearing axis. An advantageously simple and rapid installation of the electric connecting unit can be achieved, in particular since advantageously a number of possible degrees of freedom of a movement of the electric connecting element relative to the bearing element can be reduced to two. An advantageously high degree of operating comfort, in particular during installation or removal of the wiper blade adapter, can be made possible.

Furthermore, it is proposed that the electric connecting unit comprises at least one coupling element which is arranged, in particular directly, on the bearing element and the electric connecting element and delimits at least one bearing recess, wherein at least the electric connecting element and the coupling element are mounted on the bearing element via the bearing recess so as to be movable, in particular rotatable or pivotable, relative to the wiper arm adapter. In particular, the coupling element is formed integrally with the electric connecting element. The coupling element is preferably at least partially, in particular at least largely, formed from a plastic, in particular a hard plastic. The coupling element preferably has at least one bearing surface which delimits the bearing recess. The coupling element preferably has at least one further bearing surface which is arranged spaced apart from the bearing surface and which delimits at least one further bearing recess. In particular, at least the electric connecting element and the coupling element are mounted on the bearing element via the bearing recess and/or the further bearing recess so as to be movable, in particular rotatable or pivotable, relative to the wiper arm adapter. The coupling element preferably lies on the bearing element via the bearing surface and/or the further bearing surface. The bearing surface and/or the further bearing surface particularly preferably lies at least largely, in particular over the full surface, on the bearing element. In particular, the coupling element is designed such that the bearing surface and/or the further bearing surface at least largely surrounds the bearing element, in particular about the bearing axis. The coupling element is preferably provided to retain at least the electric connecting element on the bearing element via the bearing surface and/or the further bearing surface by means of a form fit. In particular, the coupling element is designed in such a manner that, at least in the connected state of the electric connecting unit, the bearing surface and/or the further bearing surface are/is arranged at a uniform distance about the bearing axis. The bearing surface and/or the further bearing surface are/is preferably formed at least substantially parallel to the bearing axis. The fact that a surface, in particular the bearing surface and/or the further bearing surface, is oriented "substantially parallel" to an axis or a plane, in particular to the bearing axis, is intended to be understood as meaning in particular that the surface at every point of the surface is at a minimum distance from the axis or the plane, said distance deviating for all points by less than 5%, preferably less than 3% and particularly preferably less than 1% from a mean value of the minimum distance of all the points. The coupling element is preferably designed in such a manner that the bearing recess and/or the further bearing recess have/has a central axis about which in particular the bearing surface and/or the further bearing surface are/is arranged at a uniform distance. The coupling element is preferably designed in such a manner that, in at least one state of the electric connecting unit, in particular of the coupling element, fastened to the bearing element, the central axis runs within the bearing axis. In at least one state of the electric connecting unit, in particular of the coupling element, fastened to the bearing element, at least a large part of the surface normal of the bearing surface and/or of the further bearing surface preferably run through the bearing axis. An advantageously secure mounting of the electric connecting element can be made possible, wherein, in particular via the coupling element, it is advantageously possible to achieve little play of the electric connecting element in respect of a movement in a radial direction with respect to the bearing element, in particular the bearing axis. An advantageously simple and rapid installation of the electric connecting unit can be achieved, in particular since advantageously a number of possible degrees of freedom of a movement of the electric connecting element relative to the bearing element can be reduced to two.

In addition, it is proposed that the wiper arm adapter at least partially surrounds the coupling element at least in a region of the coupling element, in which region the coupling element delimits the bearing recess and is arranged on the bearing element. In particular, the coupling element is at least partially surrounded by the basic body of the wiper arm adapter in a region of the coupling element, in which region the bearing surface delimits the bearing recess. The wiper arm adapter, in particular the basic body of the wiper arm adapter, preferably at least partially has a half-open, for example U-shaped or V-shaped basic shape, or a closed basic shape, in a sectional plane of the wiper arm adapter extending at least substantially perpendicularly to the main axis of extent of the wiper arm adapter. In particular, the coupling element, in particular in the region of the coupling element, in which region the coupling element delimits the bearing recess and is arranged on the bearing element, is at least partially, in particular at least largely, surrounded by the basic shape of the wiper arm adapter, in particular of the basic body of the wiper arm adapter, in at least one sectional plane of the wiper arm adapter. A region of the coupling element, in which region the coupling element, in particular via the further bearing surface, delimits the further bearing recess and is arranged on the bearing element, is preferably arranged outside the wiper arm adapter, in particular the basic body of the wiper arm adapter. The region of the coupling element, in which region the coupling element, in particular via the further bearing surface, delimits the further bearing recess and is arranged on the bearing element, is preferentially arranged, as viewed along the bearing axis, between the wiper blade adapter and the wiper arm adapter, in particular the basic body of the wiper arm adapter. A movement of the electric connecting element along the bearing element, in particular the bearing axis, can advantageously be limited. An erroneous installation or removal of the wiper blade adapter on/from the wiper arm adapter can be particularly advantageously prevented.

Furthermore, it is proposed that the electric connecting unit has at least one stop element which is arranged on the electric connecting element and, in at least one connected state of the electric connecting unit, lies, in particular directly, on the wiper arm adapter, wherein the stop element is provided to secure the electric connecting element against a movement relative to the wiper arm adapter in at least one direction oriented along an, in particular the previously mentioned, bearing axis of the bearing element. The stop element is preferably fastened to the coupling element and/or to the electric connecting element, in particular is formed integrally with the coupling element and/or the electric connecting element. The stop element preferably has at least one stop surface which, in the connected state of the electric connecting unit, lies on the wiper arm adapter, in particular on the basic body of the wiper arm adapter. The stop surface is preferably provided to support at least the stop element and the electric connecting element on the wiper arm adapter against a movement in at least one direction along the bearing axis. In particular, the stop surface is designed as a curved or as a flat surface. The stop surface preferably lies at least largely, in particular over the full surface, on the wiper arm adapter, in particular on the basic body of the wiper arm adapter. The stop surface is preferably at least partially, in particular at least largely, oriented at least substantially perpendicularly to the bearing axis. In particular, the stop surface is at least partially, in particular at least largely, oriented at least substantially perpendicularly to the bearing surface and/or to the further bearing surface. The stop surface is preferably at least partially, in particular at least largely, oriented at least substantially parallel to the main axis of extent of the wiper arm adapter and/or of the wiper blade adapter. It is conceivable for the stop surface to be arranged on a side of the stop element which faces away from the wiper arm adapter. In the connected state of the electric connecting unit, the stop element, in particular the stop surface, is in particular at least partially arranged between the wiper blade adapter and the wiper arm adapter, in particular the basic body of the wiper arm adapter. The stop surface preferentially at least partially delimits the further bearing surface of the coupling element. The stop element is particularly preferably mounted, in particular via the coupling element, together with the electric connecting element via the bearing element, so as to be movable, in particular pivotable or rotatable, in particular about the bearing axis. The stop element is preferably provided to retain the electric connecting element, in particular in a mounted state of the wiper blade adapter on the wiper arm adapter, in a position relative to, in particular on, the electric attachment element, in particular via an interaction of the stop element, in particular the stop surface, and the adapter element, in particular the basic body of the wiper arm adapter. It is advantageously possible to prevent an inadvertent and/or unintentional release of the electric connecting unit, in particular since, in the connected state of the electric connecting unit, the electric connecting element can be retained on the electric attachment element via the stop element. Fixing of the electric connecting unit can be advantageously achieved in a mounted state of the wiper blade adapter.

Furthermore, it is proposed that the electric connecting unit has at least one connecting axis, along which the electric connecting element and the electric attachment element are connectable to each other and/or are separable from each other, wherein the electric connecting element, in particular in at least one connected state of the electric connecting unit, is arranged in such a manner that the connecting axis is oriented at least substantially parallel to an, in particular the previously mentioned, bearing axis of the bearing element. "Substantially parallel" is intended to be understood as meaning in particular an orientation of a straight line or of a plane, in particular the connecting unit, relative to a further straight line or a further plane, in particular the bearing axis, wherein the straight line or the plane has a deviation of in particular less than 8°, advantageously less than 5° and particularly advantageously less than 2° in relation to the further straight line or the further plane, in particular in a plane of projection. In particular, the connecting axis runs, in particular centrally, through the electric connecting element. The connecting axis is preferably oriented at least substantially perpendicular to the main axis of extent of the wiper arm adapter and/or to the main axis of extent of the wiper blade adapter. In particular, the connecting axis is oriented at least substantially parallel to the bearing surface and/or to the further bearing surface. The connecting axis is preferably oriented at least substantially perpendicular to the stop surface. The electric connecting element is preferably designed and/or arranged in such a manner that the connecting axis and/or the electric connecting element are/is arranged, as viewed along the bearing axis, within a maximum depth extent of the wiper arm adapter. In particular, the maximum depth extent of the wiper arm adapter is oriented at least substantially perpendicular to the main axis of extent of the wiper arm adapter. The maximum depth extent of the wiper arm adapter is preferably oriented at least substantially perpendicular to a plane of the wiper arm adapter extending at least substantially parallel to the main axis of extent of the wiper arm adapter and to the bearing axis. The electric connecting element is preferably designed and/or arranged in such a manner that the connecting axis and/or the electric connecting element are/is arranged between two planes which extend between two mutually parallel extending, largest side surfaces of a smallest imaginary cuboid which only just completely surrounds the wiper arm adapter. It is advantageously possible to prevent an inadvertent and/or unintentional release of the electric connecting unit during installation or removal of the wiper blade adapter, in particular since, during a movement of the wiper blade adapter about the bearing axis, the electric connecting element and/or the electric attachment element can be formed independently of an action of force along the connecting axis. An advantageously compact windshield wiper device can be made possible along an axis oriented at least substantially perpendicular to the bearing axis and to the main axis of extent of the wiper arm adapter.

In addition, it is proposed that the electric connecting unit, in particular the electric connecting element, has, along an axis oriented at least substantially perpendicularly to an, in particular the previously mentioned, main axis of extent of the wiper arm adapter and to an, in particular the previously mentioned, bearing axis of the bearing element, a maximum distance of at most 3 cm, preferably at most 2 cm and particularly preferably at most 1 cm, to a plane of the wiper arm adapter, which plane includes the bearing axis and is oriented at least substantially parallel to the main axis of extent of the wiper arm adapter. In particular, the basic body of the wiper arm adapter has at least one top surface which is arranged on a side of the basic body of the wiper arm adapter, which side is oriented at least substantially perpendicular to the connecting axis and/or to the bearing axis and at least substantially perpendicular to the main axis of extent of the wiper arm adapter. The top surface is preferably oriented at least substantially parallel to the connecting axis, to the bearing axis and/or to the main axis of extent of the wiper arm adapter. In at least one mounted state of the wiper blade adapter on the wiper arm adapter, the electric connecting unit, in particular the electric connecting element, is particularly preferably arranged, as viewed along the top surface, at least largely, in particular at least substantially completely, on a side of the top surface facing the wiper blade adapter. The fact that a component, in particular the electric connecting unit and/or the electric connecting element "substantially completely" has a property or is arranged in a region, in particular on the side of the top surface facing the wiper blade adapter, is intended to be understood as meaning in particular that at least 95%, preferably at least 98% and particularly preferably at least 99%, of a mass, of volume and/or a surface of the component, in particular is viewed in a plane of projection, have the property or are arranged in the region. An advantageously compact windshield wiper device can be made possible, in particular since the electric connecting unit can be arranged at least largely in a region about the bearing axis, in particular along an axis oriented at least substantially perpendicular to the bearing axis and to the main axis of extent of the wiper arm adapter. Construction space in a viewing region of an occupant of a vehicle and/or building including the windshield wiper device can advantageously be saved.

Furthermore, it is proposed that the electric connecting unit comprises at least one receiving element for at least partially receiving the line element, which receiving element, in at least one connected state of the electric connecting unit, is arranged on the wiper arm adapter at least via the electric connecting element so as to be movable, in particular pivotable or rotatable. In particular, the receiving element is fastened to the electric connecting element and/or to the coupling element, in particular is formed integrally with the electric connecting element and/or the coupling element. The receiving element preferably delimits at least one receiving recess, wherein the line element is at least partially arranged inside the receiving recess. The line element is, for example, in the form of a cable or in the form of a wire. The receiving recess preferably extends along a guide section of the receiving element. The receiving element is preferably designed in such a manner that the receiving recess extends along the guide section of the receiving element as far as the electric connecting element. The receiving element preferably at least partially, in particular at least mostly, surrounds the receiving recess, as viewed in at least one plane of the receiving element that is oriented at least substantially perpendicular to the guide section. It is conceivable for the receiving element to at least substantially completely surround the receiving recess, as viewed in at least one plane of the receiving element that is oriented at least substantially perpendicular to the guide section. The receiving element is preferably at least partially designed in the manner of a channel and/or is tubular, wherein the line element is guided within the receiving recess. The receiving element is preferably designed in such a manner that the guide section is at least partially curved. The receiving element is preferably designed in such a manner that the guide section, in particular in at least one mounted state of the wiper blade adapter on the wiper arm adapter, extends within a plane oriented at least substantially parallel to the main axis of extent of the wiper arm adapter, to the connecting axis and/or to the bearing axis. The receiving element is preferably designed in such a manner that the guide section, in particular in at least one mounted state of the wiper blade adapter on the wiper arm adapter, is arranged in at least one region at least substantially parallel to the main axis of extent of the wiper arm adapter. In particular, the receiving element is designed in such a manner that, in at least one further region adjacent in particular to the electric connecting element, the guide section is arranged at least substantially parallel to the connecting axis of the wiper arm adapter and/or at least substantially perpendicular to the main axis of extent of the wiper arm adapter. It is conceivable for the electric connecting unit to comprise at least one fixing element which is arranged on the receiving element, in particular is formed integrally with the receiving element. In particular, the fixing element is provided to at least partially fix the line element relative to the receiving element. The fixing element is, for example, in the form of a hook, in the form of a clamp, in the form of a loop, in the form of a shaped component, in particular for constricting the receiving recess, or the like. The fixing element is preferably arranged at or within the receiving recess. The fixing element is preferably at least partially arranged in a wiper-arm-adapter-side or electric-connecting-element-side end region of the receiving recess. The fixing element is particularly preferably at least partially arranged in an end region of the guide section, which end region is opposite the electric connecting element. Securing of the line element in relation to vibrations can advantageously be made possible. An advantageously secure connection of the line element to the electric connecting element can be achieved, in particular since the line element can be secured, in particular in a region arranged on the electric connecting element, against movements relative to the electric connecting element by means of the receiving element. Twisting or tilting of the line element during a movement of the electric connecting element relative to the bearing element can advantageously be prevented.

Furthermore, it is proposed that, in at least one connected state of the electric connecting unit, the electric connecting element and the electric attachment element are connected to each other for conjoint rotation with respect to a movement of the wiper blade adapter relative to the wiper arm adapter, wherein the electric connecting unit is rotatable or pivotable together with the wiper blade adapter about the bearing element. In the connected state of the electric connecting unit, the electric connecting element and the electric attachment element are preferably connected to each other for conjoint rotation via a form-fitting and/or force-fitting connection. In particular, the electric connecting element and/or the electric attachment element, in particular in a region of an electrical contact, have/has a cross-sectional area different from a point-symmetrical cross-sectional area, at least substantially perpendicular to the connecting axis. For example, the electric connecting element and/or the electric attachment element have/has, in particular in a region of an electrical contact, a cross-sectional area in the shape of an elliptical surface, or a lenticular or rectangular cross-sectional area, at least substantially perpendicular to the connecting axis. It is advantageously possible to prevent an inadvertent release of the electric connecting unit, in particular of the electric connecting element, from the electric attachment element, during a movement of the wiper blade adapter relative to the wiper arm adapter about the bearing axis.

In addition, it is proposed that the electric connecting unit comprises at least one sealing element which is provided in order, in at least one connected state of the electric connecting unit, to close at least one electrical contact of the electric connecting element and/or of the electric attachment element in an air-tight and/or waterproof manner. The sealing element is preferably arranged on the electric connecting element. However, it is also conceivable for the sealing element to be arranged on the electric attachment element. The sealing element is in the form, for example, of an, in particular at least partially annular, sealing rubber, as an, in particular silicone-containing, sealing compound, a sealing strip or the like. In the connected state, the sealing element is preferably at least partially, in particular at least largely, arranged between the electric connecting element and the electric attachment element. The sealing element is preferably provided to close the at least one electrical contact of the electric connecting element and/or of the electric attachment element in an air-tight and/or water-proof manner via an, in particular form-fitting, interaction between the electric connecting element and the electric attachment element. The sealing element is preferably arranged around the connecting axis. In particular, the sealing element surrounds the connecting axis at least substantially completely in at least one cross-sectional plane of the electric connecting element. An advantageously high degree of protection of the electrical connection between the wiper blade adapter and the wiper arm adapter from liquids, in particular water, and/or dirt can be made possible. It is advantageously possible to prevent short circuits between the electrical contacts. An advantageously secure electrical connection can be achieved.

Furthermore, it is proposed that the electric connecting unit comprises at least one form-fitting element which lies on at least one contact surface of the wiper blade adapter, said contact surface being oriented at least substantially parallel to an, in particular the previously mentioned, connecting axis of the electric connecting unit and to an, in particular the previously mentioned, main axis of extent of the wiper blade adapter, and is provided to limit at least a movement of the electric connecting element about an, in particular the previously mentioned, bearing axis of the bearing element during connection of the electric connecting unit to the electric attachment element. The form-fitting element is preferably fastened to the electric connecting element and/or to the coupling element, in particular is formed integrally with the electric connecting element and/or the coupling element. The form-fitting element preferably comprises at least one supporting surface, wherein, in at least connected state of the electric connecting unit, the supporting surface lies in particular at least largely and/or over the full surface, on the contact surface. The supporting surface and/or the contact surface are/is, for example, in the form of (a) curved or (a) flat surface(s). In particular, the contact surface extends over in particular at least 50%, preferably at least 60% and particularly preferably at least 70%, of a maximum transverse extent of the wiper blade adapter. The maximum transverse extent of the wiper blade adapter is preferably oriented at least substantially perpendicular to the main axis of extent of the wiper blade adapter. The maximum transverse extent of the wiper blade adapter is preferably oriented at least substantially parallel to the connecting axis and/or to the bearing axis. In particular, the form-fitting element, in particular in the connected state of the electric connecting unit, extends over in particular at least 50%, preferably at least 60% and particularly preferably at least 70%, of the maximum transverse extent of the wiper blade adapter. The form-fitting element preferably at least largely extends at least substantially parallel to the connecting axis and/or to the bearing axis. The form-fitting element is preferably arranged on a side of the bearing axis facing the connecting axis, as viewed in a plane of projection spanned by the connecting axis and the bearing axis. As viewed in the plane of projection spanned by the connecting axis and the bearing axis, the form-fitting element is preferably arranged between the bearing axis and the connecting axis or on a side of the connecting axis facing away from the bearing axis. The form-fitting element is, for example, in the form of a retaining finger, in the form of a bolt, in the form of a pin or the like. The form-fitting element is preferably provided to center the electric connecting element on the connecting axis during connection of the electric connecting unit, in particular for connecting the electric connecting element to the electric attachment element. The contact surface and the supporting surface preferably have at least one common contact axis along which the contact surface and the supporting surface lie on each other in the connected state of the electric connecting unit. The electric connecting element and the electric attachment element preferably each have at least one central axis, the central axes being oriented at least substantially parallel to the connecting axis. The form-fitting element is particularly preferably arranged and/or designed in such a manner that a minimum distance of the contact axis and of the central axis of the electric connecting element about the bearing axis along a circumferential direction corresponds at least substantially to a minimum distance of the contact axis and of the central axis of the electric attachment element about the bearing axis along the circumferential direction. An advantageously simple and rapid connection of the electric connecting unit can be achieved, in particular during installation of the wiper blade adapter on the wiper arm adapter, in particular since the stop element can be used to predetermine for a user a position about the bearing axis for connecting the electric connecting element to the electric attachment element. Centering of the electric connecting element relative to the electric attachment element can advantageously be achieved during installation of the windshield wiper device.

In addition, a windshield wiper having at least one windshield wiper device according to the invention is proposed. The windshield wiper preferably has at least one wiper arm which comprises the wiper arm adapter. The windshield wiper preferably has the wiper blade. The wiper blade is preferably fastenable via the wiper blade adapter and the wiper arm adapter to the wiper arm and, in at least one operating state, is mounted rotatably relative to the wiper arm, in particular for installing or removing the wiper blade. In particular, the windshield wiper comprises the energy storage unit, which is in particular in the form of a battery, and the electrical unit, which is in particular in the form of a heating unit and which is connectable to the energy storage unit, in particular via the electric connecting unit, in particular the electric connecting element and the electric attachment element.

By means of the embodiment according to the invention of the windshield wiper, an advantageously secure electrical connection of the wiper blade to the wiper arm can be made possible, in particular since the electric connecting element can move together with the wiper blade during a movement of the wiper blade, in particular of the electric attachment element, about the bearing axis. It is advantageously possible to prevent an unintentional and/or inadvertent release of the electric connecting unit, in particular of the electric connecting element, from the electric attachment element, during a movement of the wiper blade about the bearing axis. An advantageously simple and rapid installation of the electric connecting unit can be achieved, in particular since advantageously a number of possible degrees of freedom of movement of the electric connecting element relative to the bearing element can be reduced to two. An advantageously high degree of operating comfort, in particular during installation or removal of the wiper blade, can be made possible.

The windshield wiper device according to the invention and/or the windshield wiper according to the invention are/is not intended to be restricted here to the above-described use and embodiment. In particular, the windshield wiper device according to the invention and/or the windshield wiper according to the invention, in order to perform a function described herein, may have a number of individual elements, components and units which differs from the number mentioned herein. In addition, in the ranges of values indicated in this disclosure, values lying within the limits mentioned are also intended to be considered to be disclosed and usable as desired.

BRIEF DESCRIPTION OF THE DRAWINGS

Further advantages emerge from the description below of the drawings. The drawings illustrate two exemplary embodiments of the invention. The drawings, the description and the claims contain numerous features in combination. A person skilled in the art will expediently also consider the features individually and combine them to form meaningful further combinations.

In the drawings.

DETAILED DESCRIPTION

Figure 1:
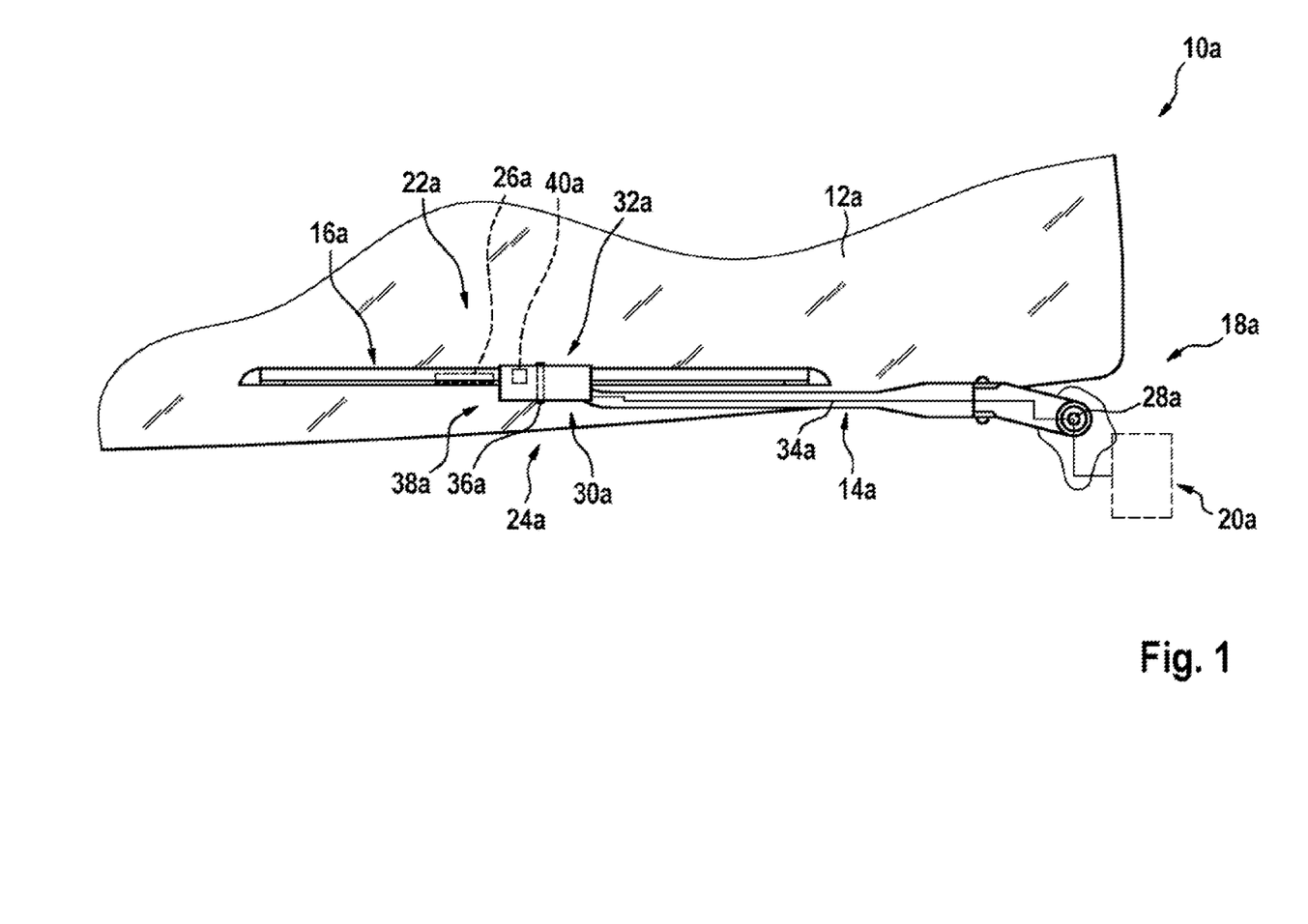
FIG. 1 shows a schematic illustration of the windshield wiper according to the invention with a windshield wiper device according to the invention in a mounted state on a window.

FIG. 1 shows a windshield wiper 10a in a mounted state on a window 12a. The window 12a is in particular in the form of a windshield of a vehicle which is not completely shown in the figure. However, it is also conceivable for the windshield wiper 10a to be arranged on a window 12a of a stationary object, for example of a building, or on another means of transport. The windshield wiper 10a comprises a wiper arm 14a, a wiper blade 16a, a drive unit 18a, an energy storage unit 20a, an electrical unit 22a and a windshield wiper device 24a. In particular, the electrical unit 22a is designed as a heating unit and is provided to heat at least one fluid channel and/or a surface of the wiper blade 16a. The electrical unit 22a designed as a heating unit has an electrical energy 26a which is designed as a heating element and is arranged on the wiper blade 16a, in particular on or in the fluid channel of the wiper blade 16a. However, other embodiments of the electrical unit 22a, in particular of the electrical element 26a, are also conceivable, in particular in the form of a sensor unit, a display unit or the like. The drive unit 18a is preferably a drive shaft 28a which is driven by a drive element of the drive unit 18a, which drive element is not shown in particular in FIG. 1, wherein in particular the wiper arm 14a is fastened to the drive shaft 28a and is movable along the window 12a via the drive shaft 28a. The energy storage unit 20a is in particular in the form of a battery. However, other embodiments of the energy storage unit 20a are also conceivable, in particular in the form of an external power network or the like. The wiper arm 14a comprises a wiper arm adapter 30a. In particular, the wiper arm adapter 30a is in the form of a side-lock wiper arm adapter. The wiper blade 16a comprises a wiper blade adapter 32a, wherein the wiper blade 16a is fastenable to the wiper arm 14a, in particular to the wiper arm adapter 30a, via the wiper blade adapter 32a. In particular, in at least one operating state of the windshield wiper 10a, in particular of the windshield wiper device 24a, the wiper blade 16a is mounted rotatably relative to the wiper arm 14a via the wiper blade adapter 32a and the wiper arm adapter 30a, in particular for installation or removal of the wiper blade 16a.

The wiper blade adapter 32a and the wiper arm adapter 30a are part of the windshield wiper device 24a. The wiper arm adapter 30a has two line elements 34a and a bearing element 36a. In particular, the wiper blade adapter 32a is mounted movably, in particular pivotably, on the wiper arm adapter 30a via the bearing element 36a of the wiper arm adapter 30a. The line elements 34a are provided for an electrical connection of the energy storage unit 20a and of the electrical unit 22a, in particular the electrical element 26a. In particular, the line elements 34a run at least partially along the wiper arm 14a, in particular from the drive shaft 28a, as far as the wiper arm adapter 30a. The windshield wiper device 24a comprises an electric connecting unit 38a for electrically connecting the line elements 34a of the wiper arm adapter 30a to at least one electric attachment element 40a of the wiper blade adapter 32a. In particular, the electric attachment element 40a is electrically connected to the electrical element 26a of the electrical unit 22a.

Figure 2:
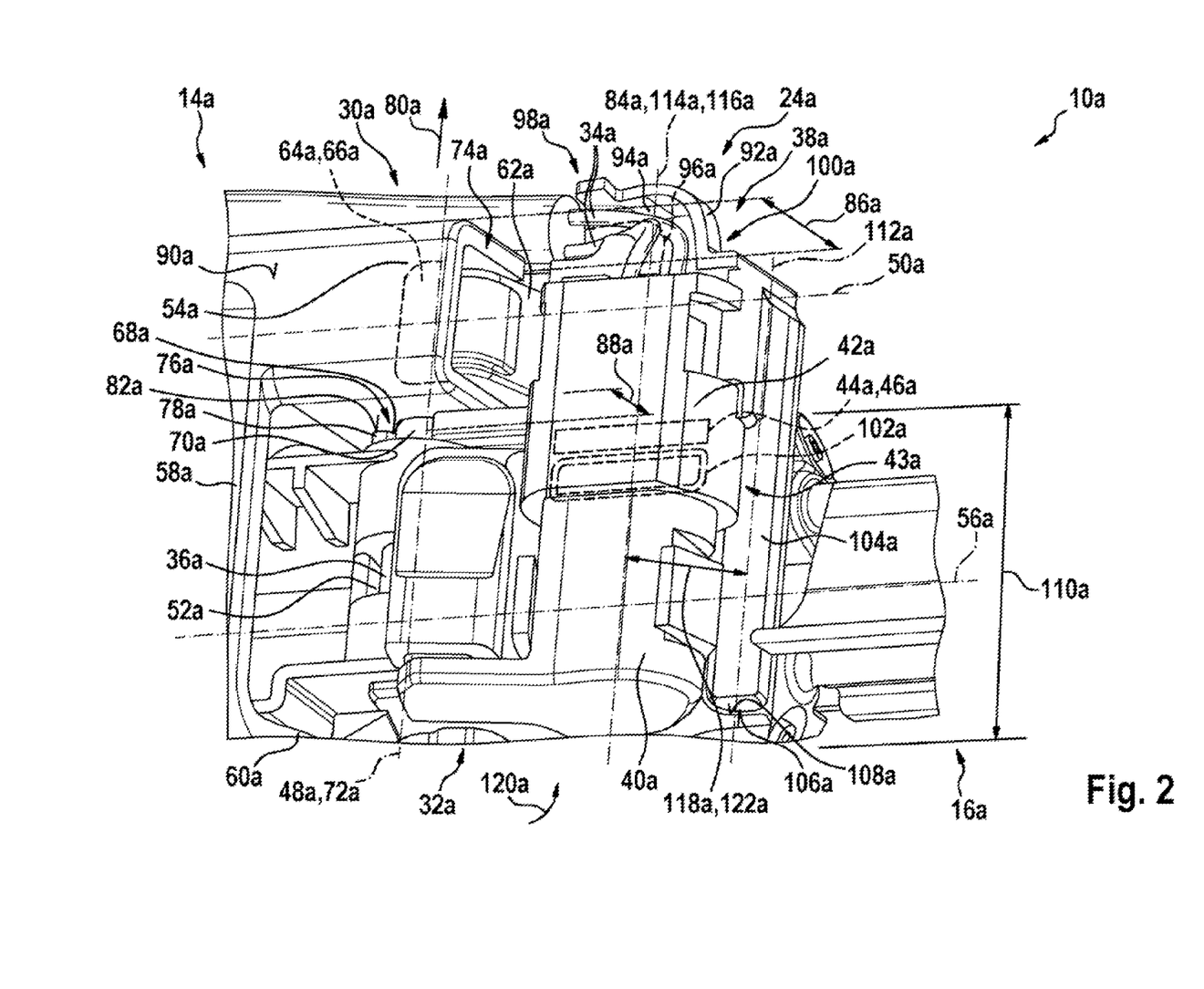
FIG. 2 shows a schematic detailed view of the windshield wiper according to the invention in a region of the windshield wiper device according to the invention.

FIG. 2 shows a detailed view of the windshield wiper 10a in a region of the windshield wiper device 24a. The electric connecting unit 38a comprises an electric connecting element 42a which is arranged on the wiper arm adapter 30a and is mounted via the bearing element 36a so as to be movable, in particular rotatable or pivotable, at least relative to the wiper arm adapter 30a. The electric connecting element 42a and the electric attachment element 40a are designed as part of an electric plug connection of the windshield wiper device 24a. The electric connecting element 42a and the electric attachment element 40a are designed as plugs, formed in particular in a manner corresponding to each other. However, other embodiments of the electric connecting element 42a and/or the electric attachment element 40a are also conceivable, for example in the form of a coil and/or in the form of an electrical contact. The electric attachment element 40a is preferably in the form of an attachment pin in at least one region 44a of the electric attachment element 40a. The electric connecting unit 42a is preferably in the form of an attachment socket in at least one region 46a of the electric connecting element 42a. The electric connecting element 42a and the electric attachment element 40a are preferably of two-pole design. However, it is also conceivable for the electric connecting element 42a and/or the electric attachment element 40a to be of one-pole or multi-pole design. The line elements 34a are connected at least electrically to the electrical connecting element 42a, in particular to the attachment pin. In at least one connected state, in particular the connected state shown in FIG. 1, of the electric connecting unit 38a, the electric connecting element 42a and the electric attachment element 40a are electrically connected to each other. The electric connecting element 42a and the electric attachment element 40a in particular with the exception of a contact region of the electric connecting element 42a for the electrical connection which is not shown in FIG. 2, are at least largely formed from a plastic. In the connected state of the electric connecting unit 38a, the electric connecting element 42a and the electric attachment element 40a are fastened to each other via a force fit. The electric connecting element 42a is at least partially designed in at least one region 43a as a plug collar which, in the connected state of the electric connecting unit 38a, lies in a form-fitting manner on the electric attachment element 40a. When the electric connecting element 42a is connected to the electric attachment element 40a, the plug collar is provided in particular to be at least partially pushed onto the electric attachment element 40a. In the connected state of the electric connecting unit 38a, the electric connecting element 42a and the electric attachment element 40a are connected to each other for conjoint rotation with respect to a movement of the wiper blade adapter 32a relative to the wiper arm adapter 30a, wherein the electric connecting unit 38a is rotatable or pivotable together with the wiper blade adapter 32a about the bearing element 36a. In the connected state of the electric connecting unit 38a, the electric connecting element 42a and the electric attachment element 40a are connected to each other for conjoint rotation via a form-fitting connection. In particular, the electric connecting element 42a and the electric attachment element 40a, in particular in a region 44, 46 of an electrical contact, have a cross-sectional area different from a point-symmetrical cross-sectional area, at least substantially perpendicular to a connecting axis 84a of the electric connecting unit 38a.

The bearing element 36a has a bearing axis 48a about which the wiper blade adapter 32a is mounted on the wiper arm adapter 30a. The electric connecting element 42a is mounted rotatably or pivotably about the bearing axis 48a via the bearing element 36a. The bearing axis 48a and the bearing element 36a are oriented at least substantially perpendicular to a main axis of extent 50a of the wiper arm adapter 30a. The bearing element 36a is designed in particular as a bearing bolt. However, other embodiments of the bearing element 36a are also conceivable. In particular, the wiper blade adapter 32a delimits a recess 52a within which the bearing element 36a is arranged in a state of the wiper blade adapter 32a mounted on the wiper arm adapter 30a. The bearing element 36a is preferably fastened, in particular for conjoint rotation, to a basic body 54a of the wiper arm adapter 30a. The electric connecting element 42a is mounted via the bearing element 36a so as to be movable, in particular rotatable or pivotable, relative to the basic body 54a of the wiper arm adapter 30a. The bearing element 36a is arranged in such a manner that, in particular in at least one mounted state of the wiper blade adapter 32a on the wiper arm adapter 30a, the bearing axis 48a is oriented at least substantially perpendicular to a main axis of extent 56a of the wiper blade adapter 32a.

The wiper arm adapter 30a comprises a retaining element 58a for retaining the wiper blade adapter 32a on the wiper arm adapter 30a, in particular on the bearing element 36a. In particular, the fastening element 58a is provided to retain the wiper blade adapter 32a in at least one position relative to the wiper arm adapter 30a along the bearing axis 48a. The retaining element 58a is in the form of a retaining finger which extends from the basic body 54a of the wiper arm adapter 30a over a maximum transverse extent 110a of the wiper blade adapter 32a and is provided to at least partially engage around the wiper blade adapter 32a in a final installation position. The retaining element 58a is preferably provided to at least partially limit a movement of the wiper blade adapter 32a about the bearing element 36a, in particular in at least one direction about the bearing axis 48a. The wiper blade adapter 32a preferably has a mating contact surface 60a on which the retaining element 58a lies in at least one mounted state of the wiper blade adapter 32a. The mating contact surface 60a is preferably at least partially oriented at least substantially perpendicular to the bearing axis 48a. However, other embodiments of the retaining element 58a and/or of the mating contact surface 60a are also conceivable. The retaining element 58a is formed integrally with the basic body 54a of the wiper arm adapter 30a. In particular in at least one unconnected state of the electric connecting unit 38a, the electric connecting element 42a is mounted via the bearing element 36a so as to be movable, in particular rotatable or pivotable, relative to the wiper arm adapter 30a independently of the retaining element 58a. In the connected state of the electric connecting unit 38a, the electric connecting element 42a is coupled to a movement of the wiper blade adapter 32a about the bearing axis 48a via the electric attachment element 40a. The electric attachment element 40a is fastened for conjoint rotation to a basic body 54a of the wiper blade adapter 32a.

The electric connecting unit 38a has a coupling element 62a which is arranged, in particular directly, on the bearing element 36a and the electric connecting element 42a and delimits at least one bearing recess 64a (cf. FIG. 3), wherein at least the electric connecting element 42a and the coupling element 62a are mounted on the bearing element 36a via the bearing recess 64a so as to be movable, in particular rotatable or pivotable, relative to the wiper arm adapter 30a. The coupling element 62a is formed integrally on the electric connecting element 42a. However, it is also conceivable for the coupling element 62a to be formed separately from the electric connecting element 42a and to be fastened to the electric connecting element 42a. The coupling element 62a is at least largely formed from a plastic. The coupling element 62a has a bearing surface 66a (cf. FIG. 3) and a further bearing surface 68a (cf. FIG. 3), wherein the bearing surface 66a delimits the bearing recess 64a and the further bearing surface 68a delimits a further bearing recess 70a. At least the electric connecting element 42a and the coupling element 62a are mounted on the bearing element 36a via the bearing recess 64a and the further bearing recess 70a so as to be movable, in particular rotatable or pivotable, relative to the wiper arm adapter 30a. The coupling element 62a lies on the bearing element 36a via the bearing surface 66a and the further bearing surface 68a. The bearing surface 66a and the further bearing surface 68a lie at least largely on the bearing element 36a. The coupling element 62a is designed in such a manner that the bearing surface 66a and the further bearing surface 68a at least largely surround the bearing element 36a, in particular about the bearing axis 48a. In particular, the coupling element 62a is provided to retain at least the electric connecting element 42a via the bearing surface 66a, and the further bearing surface 68a by a form fit, on the bearing element 36a. In particular, the bearing surface 66a and the further bearing surface 68a are formed at least substantially parallel to the bearing axis 48a. The coupling element 62a is designed in such a manner that the bearing recess 64a and the further bearing recess 70a have a central axis 72a about which in particular the bearing surface 66a and the further bearing surface 68a are arranged at a uniform distance. In at least one state of the electric connecting unit 38a, in particular of the coupling element 62a, which state is shown in particular in FIG. 1 and fastened to the bearing element 36a, the coupling element 62a is designed in such a manner that the central axis 72a runs within the bearing axis 48a. The wiper arm adapter 30a surrounds the coupling element 62a at least in a region 74a of the coupling element 62a, in which region the coupling element 62a delimits the bearing recess 64a and on which the bearing element 36a is at least partially arranged. In the region 74a of the coupling element 62a, in which region the bearing surface 66a delimits the bearing recess 64a, the coupling element 62a is at least partially surrounded by the basic body 54a of the wiper arm adapter 30a. The basic body 54a of the wiper arm adapter 30a at least partially has a U-shaped basic shape in a sectional plane of the wiper arm adapter 30a, said sectional plane extending at least substantially perpendicular to the main axis of extent 50a of the wiper arm adapter 30a. However, other embodiments of the wiper arm adapter 30a, in particular of the basic body 54a of the wiper arm adapter 30a, are also conceivable, for example with a V-shaped or a closed basic shape. In the region 74a of the coupling element 62a, in which region the coupling element 62a delimits the bearing recess 64a and is arranged on the bearing element 36a, the coupling element 62a is at least largely surrounded by the basic shape of the basic body 54a of the wiper arm adapter 30a in at least one sectional plane of the wiper arm adapter 30a. A region 76a of the coupling element 62a, in which region the coupling element 62a, in particular via the further bearing surface 68a, delimits the further bearing recess 70a and is arranged on the bearing element 36a, is arranged outside the wiper arm adapter 30a, in particular the basic body 54a of the wiper arm adapter 30a. In particular, the region 76a of the coupling element 62a, in which region the coupling element 62a, in particular via the further bearing surface 68a, delimits the further bearing recess 70a and is arranged on the bearing element 36a, is arranged, as viewed along the bearing axis 48a, between the wiper blade adapter 32a and the wiper arm adapter 30a, in particular the basic body 54a of the wiper arm adapter 30a. However, other embodiments of the coupling element 62a are also conceivable.

The electric connecting unit 38a comprises a stop element 78a which is arranged, in particular via the coupling element 62a, on the electric connecting element 42a and, in the connected state of the electric connecting unit 38a, lies, in particular directly, on the wiper arm adapter 30a, in particular the basic body 54a of the wiper arm adapter 30a, wherein the stop element 78a is provided to secure the electric connecting element 42a against a movement relative to the wiper arm adapter 30a in at least one direction 80a oriented along the bearing axis 48a of the bearing element 36a. The stop element 78a is formed integrally with the coupling element 62a and the electric connecting element 42a. The stop element 78a has a stop surface 82a which, in the connected state of the electric connecting unit 38a, lies on the wiper arm adapter 30a, in particular the basic body 54a of the wiper arm adapter 30a. In particular, the stop surface 82a is designed as a flat surface. The stop surface 82a lies over the full surface on the wiper arm adapter 30a, in particular the basic body 54a of the wiper arm adapter 30a. The stop surface 82a is at least largely oriented at least substantially perpendicular to the bearing axis 48a. The stop surface 82a is oriented at least largely at least substantially perpendicular to the bearing surface 66a and to the further bearing surface 68a. The stop surface 82a is oriented at least largely at least substantially parallel to the main axis of extent 50a of the wiper arm adapter 30a. In particular in the mounted state of the wiper blade adapter 32a that is shown in FIG. 2, the stop surface 82a is at least largely oriented at least substantially parallel to the main axis of extent 56a of the wiper blade adapter 32a. The stop surface 82a is arranged on a side of the stop element 78a facing away from the wiper blade adapter 32a. In particular, in the connected state of the electric connecting unit 38a, the stop element 78a, in particular the stop surface 82a, is at least partially arranged between the wiper blade adapter 32a and the wiper arm adapter 30a, in particular the basic body 54a of the wiper arm adapter 30a. The stop surface 82a at least partially delimits the further bearing surface 68a of the coupling element 62a. In particular, the stop element 78a is mounted, in particular via the coupling element 62a, together with the electric connecting element 42*a* via the bearing element 36*a*, so as to be movable, in particular pivotable or rotatable, in particular about the bearing axis 38*a*. The stop element 78*a* is preferably provided to retain the electric connecting element 42*a*, in particular in a mounted state of the wiper blade adapter 32*a* on the wiper arm adapter 30*a*, in a position relative to, in particular on, the electric attachment element 40*a*, in particular via an interaction of the stop element 78*a*, in particular the stop surface 82*a*, and the wiper arm adapter 30*a*, in particular the basic body 54*a* of the wiper arm adapter 30*a*. However, other embodiments of the stop element 78*a* are also conceivable, wherein the stop element 78*a* is formed, for example, separately from the coupling element 62*a*.

The electric connecting unit 38*a* has the connecting axis 84*a*, along which the electric connecting element 42*a* and the electric attachment element 40*a* are connectable to each other and/or are separable from each other, wherein the electric connecting element 42*a*, in particular in at least one connected state of the electric connecting unit 38*a*, is arranged in such a manner that the connecting axis 84*a* is oriented at least substantially parallel to the bearing axis 48*a* of the bearing element 36*a*. The connecting axis 84*a* runs centrally through the electric connecting element 42*a*. The connecting axis 84*a* is oriented at least substantially perpendicular to the main axis of extent 50*a* of the wiper arm adapter 30*a* and to the main axis of extent 56*a* of the wiper blade adapter 32*a*. The connecting axis 84*a* is oriented at least substantially parallel to the bearing surface 66*a* and to the further bearing surface 68*a*. The connecting axis 84*a* is oriented at least substantially perpendicular to the stop surface 82*a*. In particular, the electric connecting element 42*a* is designed and/or arranged in such a manner that the connecting axis 84*a* and the electric connecting element 42*a* are arranged within a maximum depth extent 86*a* of the wiper arm adapter 30*a*, as viewed along a plane of the wiper arm adapter 30*a* extending at least substantially parallel to the main axis of extent 50*a* of the wiper arm adapter 30*a* and to the bearing axis 48*a*, wherein in particular the maximum depth extent 86*a* of the wiper arm adapter 30*a* is oriented at least substantially perpendicular to the plane of the wiper arm adapter 30*a* extending at least substantially parallel to the main axis of extent 50*a* of the wiper arm adapter 30*a* and to the bearing axis 48*a*.

The electric connecting unit 38*a*, in particular the electric connecting element 42*a*, has, along an axis oriented at least substantially perpendicular to the main axis of extent 50*a* of the wiper arm adapter 30*a* and to the bearing axis 48*a* of the bearing element 36*a*, a maximum distance 88*a* of at most 3 cm, preferably at most 2 cm, particularly preferably at most 1 cm and very particularly preferably of 1 cm, from a plane of the wiper arm adapter 30*a*, which plane includes the bearing axis 48*a* and is oriented at least substantially parallel to the main axis of extent 50*a* of the wiper arm adapter 30*a*. The basic body 54*a* of the wiper arm adapter 30*a* has a top surface 90*a* which is arranged on a side of the basic body 54*a* of the wiper arm adapter 30*a*, which side is oriented at least substantially perpendicular to the connecting axis 84*a* and to the bearing axis 48*a* and at least substantially perpendicular to the main axis of extent 50*a* of the wiper arm adapter 30*a*. The top surface 90*a* is at least largely oriented at least substantially parallel to the connecting axis 84*a*, to the bearing axis 48*a* and to the main axis of extent 50*a* of the wiper arm adapter 30*a*. In at least one mounted state of the wiper blade adapter 32*a* on the wiper arm adapter 30*a*, the electric connecting unit 38*a*, in particular the electric connecting element 42*a*, is arranged, as viewed along the top surface 90*a*, at least substantially completely on a side of the top surface 90*a* facing the wiper blade adapter 32*a*.

The electric connecting unit 38*a* comprises a receiving element 92*a* for at least partially receiving the line elements 34*a*, wherein, in at least one connected state of the electric connecting unit 38*a*, the receiving element 92*a* is arranged on the wiper arm adapter 30*a* at least via the electric connecting element 42*a* so as to be movable, in particular pivotable or rotatable. The receiving element 92*a* is formed integrally with the electric connecting element 42*a* and the coupling element 62*a*. The receiving element 92*a* delimits a receiving recess 94*a*, wherein the line elements 34*a* are at least partially arranged within the receiving recess 94*a*. The line elements 34*a* are each in the form of a cable. However, other embodiments of the line elements 34*a* are also conceivable. The receiving recess 94*a* extends along a guide section 96*a* of the receiving element 92*a*. The receiving element 92*a* is designed in such a manner that the receiving recess 94*a* extends along the guide section 96*a* of the receiving element 92*a* as far as the electric connecting element 42*a*. The receiving element 92*a* at least largely surrounds the receiving recess 94*a*, as viewed in at least one plane of the receiving element 92*a* oriented at least substantially perpendicular to the guide section 96*a*. The receiving element 92*a* is of at least partially channel-like design, with the line elements 34*a* being guided within the receiving recess 94*a*. The guide section 96*a* is at least partially curved. The receiving element 92*a* is designed in such a manner that the guide section 96*a*, in particular in at least one mounted state of the wiper blade adapter 32*a* on the wiper arm adapter 30*a*, extends within a plane oriented at least substantially parallel to the main axis of extent 50*a* of the wiper arm adapter 30*a*, to the connecting axis 84*a* and/or to the bearing axis 48*a*. The receiving element 92*a* is designed in such a manner that the guide section 96*a*, in particular in at least one mounted state of the wiper blade adapter 32*a* on the wiper arm adapter 30*a*, is arranged in at least one region 98*a* at least substantially parallel to the main axis of extent 50*a* of the wiper arm adapter 30*a*. The receiving element 92*a* is designed in such a manner that the guide section 96*a*, in at least one further region 100*a* in particular adjacent to the electric connecting element 42*a*, is arranged at least substantially parallel to the connecting axis 84*a* and/or at least substantially perpendicular to the main axis of extent 50*a* of the wiper arm adapter 30*a*.

The electric connecting unit 38*a* comprises a sealing element 102*a* which is provided in order, in the connected state of the electric connecting unit 38*a*, to close at least one electrical contact of the electric connecting element 42*a* and/or of the electric attachment element 40*a* in an air-tight and/or waterproof manner. The sealing element 102*a* is arranged on the electric connecting element 42*a*. It is also conceivable for the sealing element 102*a* to be arranged on the electric attachment element 40*a*. The sealing element 102*a* is in the form of an, in particular at least partially annular, sealing rubber. However, other embodiments of the sealing element 102*a* are also conceivable, for example in the form of an, in particular silicone-containing, sealing compound, in the form of a sealing strip or the like. In the connected state, the sealing element 102*a* is at least largely arranged between the electric connecting element 42*a* and the electric attachment element 40*a*. The sealing element 102*a* is provided in particular to close the at least one electrical contact of the electric connecting element 42*a* and/or the electric attachment element 40*a* in an air-tight and/or waterproof manner via a form-fitting interaction between the electric connecting element 42*a* and the electric attachment element 40*a*. The sealing element 102*a* is arranged around the connecting axis 84*a*. The sealing element 102*a* at least substantially completely surrounds the connecting axis 84*a* in at least one cross-sectional plane of the electric connecting element 42*a*.

The electric connecting unit 38*a* comprises a form-fitting element 104*a* which lies on at least one contact surface 106*a* of the wiper blade adapter 32*a*, said contact surface being oriented at least substantially parallel to the connecting axis 84*a* of the electric connecting unit 38*a* and to the main axis of extent 56*a* of the wiper blade adapter 32*a*, and is provided to limit at least a movement of the electric connecting element 42*a* about the bearing axis 48*a* of the bearing element 36*a* during connection of the electric connecting unit 38*a* to the electric attachment element 40. The form-fitting element 104*a* is formed integrally with the electric connecting element 42*a* and/or the coupling element 62*a*. The form-fitting element 104*a* has a supporting surface 108*a*, wherein, in the connected state of the electric connecting unit 38*a*, the supporting surface 108*a* lies at least largely and/or over the full surface on the contact surface 106*a*. The supporting surface 108*a* and the contact surface 106*a* are designed as curved surfaces. However, it is also conceivable for the supporting surface 108*a* and the contact surface 106*a* to be designed as flat surfaces. The contact surface 106*a* extends over in particular at least 50%, preferably at least 60%, particularly preferably at least 70% and very particularly preferably over 90%, of the maximum transverse axis 110*a* of the wiper blade adapter 32*a*. In particular, the maximum transverse extent 110*a* of the wiper blade adapter 32*a* is oriented at least substantially perpendicular to the main axis of extent 56*a* of the wiper blade adapter 32*a*. The minimum transverse extent 110*a* of the wiper blade adapter 32*a* is oriented at least substantially parallel to the connecting axis 84*a* and to the bearing axis 48*a*. In particular in the connected state of the electric connecting unit 38*a*, the form-fitting element 104*a* extends over in particular at least 50%, preferably at least 60%, particularly preferably at least 70% and very particularly preferably over 90%, of the maximum transverse extent 110*a* of the wiper blade adapter 32*a*. The form-fitting element 104*a* extends at least largely at least substantially parallel to the connecting axis 84*a* and to the bearing axis 48*a*. The form-fitting element 104*a* is arranged on a side of the bearing axis 48*a* facing the connecting axis 84*a*, as viewed in a plane of projection spanned by the connecting axis 84*a* and the bearing axis 48*a*. As viewed in the plane of projection spanned by the connecting axis 84*a* and the bearing axis 48*a*, the form-fitting element 104*a* is arranged on a side of the connecting axis 84*a* facing away from the bearing axis 48*a*. However, it is also conceivable for the form-fitting element 104*a* to be arranged between the bearing axis 48*a* and the connecting axis 84*a*, as viewed in the plane of projection spanned by the connecting axis 84*a* and the bearing axis 48*a*. In particular, the form-fitting element 104*a* is designed as a retaining finger. However, other embodiments of the form-fitting element 104*a* are also conceivable, in the form of a bolt, in the form of a pin or the like. In particular, the form-fitting element 104*a* is provided to center the electric connecting element 42*a* on the connecting axis 84*a* during connection of the electric connecting unit 38*a*, in particular for connecting the electric connecting element 42*a* to the electric attachment element 40*a*. The contact surface 106*a* and the supporting surface 108*a* have a common contact axis 112*a*, along which the contact surface 106*a* and the supporting surface 108*a* lie on each other in the connected state of the electric connecting unit 38*a*. The electric connecting element 42*a* and the electric attachment element 40*a* each have at least one central axis 114*a*, 116*a*, which central axes are oriented at least substantially parallel to the connecting axis 84*a*. The form-fitting element 104*a* is arranged and/or designed in such a manner that a minimum distance 118*a* of the contact axis 112*a* and of the central axis 114*a* of the electric connecting element 42*a* about the bearing axis 48*a* along a circumferential direction 120*a* corresponds at least substantially to a minimum distance 112*a* of the contact axis 112*a* and of the central axis 116*a* of the electric attachment element 40*a* about the bearing axis 48*a* along the circumferential direction 120*a*.

Figure 3:
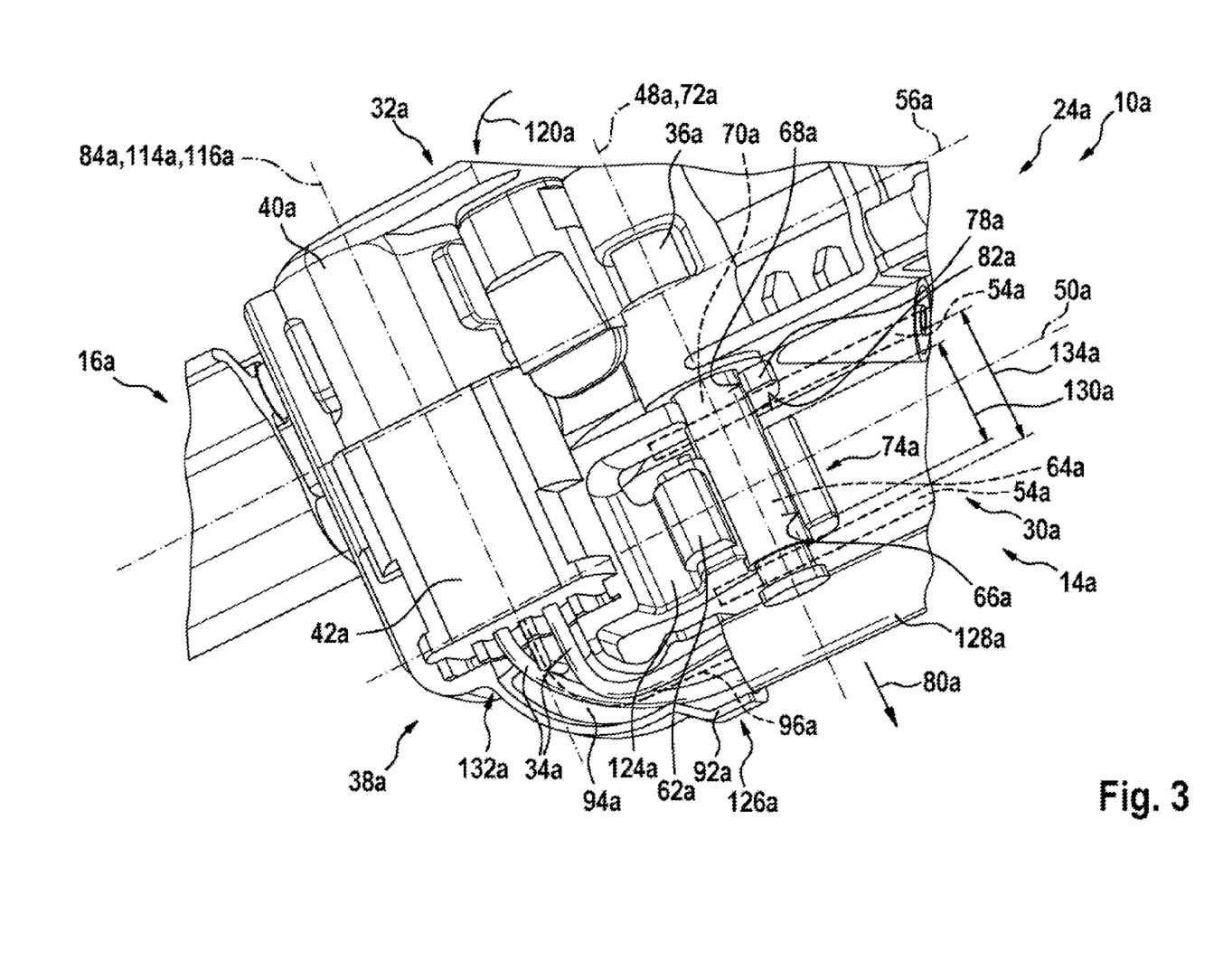
FIG. 3 shows a schematic detailed view of the windshield wiper device according to the invention in a region of an electric connecting element, a receiving element and a coupling element of an electric connecting unit of the windshield wiper device, in particular without a basic body of a wiper arm adapter of the windshield wiper.

FIG. 3 shows the windshield wiper device 24*a* independently of the basic body 54*a* of the wiper arm adapter 30*a* and of the retaining element 58*a* of the wiper arm adapter 30*a*, wherein in particular the basic body 54*a* of the wiper arm adapter 30*a* is merely indicated on the bearing element 36*a*. The coupling element 62*a* delimits a cutout 124*a* which extends at least substantially parallel to the bearing axis 48*a*. In particular, during a movement of the coupling element 62*a* and of the electric connecting element 42*a* about the bearing axis 48*a*, in particular together with the wiper blade adapter 32*a*, the basic body 54*a* of the wiper arm adapter 30*a* is at least partially moved into the cutout 124*a*. The cutout 124*a* preferably limits a movement of the coupling element 62*a* and of the electric connecting element 42*a* about the bearing axis 48*a*, in particular along the circumferential direction 120*a*. The receiving element 92*a*, in particular the receiving recess 94*a* delimited by the receiving element 92*a*, is formed in a wiper-arm-adapter-side end region 126*a* of the receiving element 92*a* in such a manner that a line sheath 128*a* of the line elements 34*a* is at least partially surrounded by the receiving element 92*a*. The two line elements 34*a* are at least partially arranged within the receiving recess 94*a*. In particular, the receiving recess 94*a* is divided in an electric-connecting-element-side end region 132*a* of the receiving element 92*a*, with the two line elements 34*a* being guided separately to the electric connecting element 42*a*. In the region 74*a* of the coupling element 62*a*, in which region the coupling element 62*a* delimits the bearing recess 64*a* and is arranged on the bearing element 36*a*, the coupling element 62*a* is formed along the bearing axis 48*a* over a length 130*a* which is smaller than an inner maximum transverse extent 134*a* of the basic body 54*a* of the wiper arm adapter 30*a* along the bearing axis 48*a*. In particular, the bearing surface 66*a* and the further bearing surface 68*a* surround the bearing element 36*a* about the bearing axis 48*a* in particular by more than 50%, preferably by more than 55%, particularly preferably by more than 60% and very particularly preferably by 65%, of a circumference of the bearing element 36*a*, in particular as viewed in a plane of the bearing element 36*a* extending at least substantially perpendicular to the bearing axis 48*a*. It is also conceivable for the bearing surface 66*a* and the further bearing surface 68*a* to be formed differently from each other.

Figure 4:
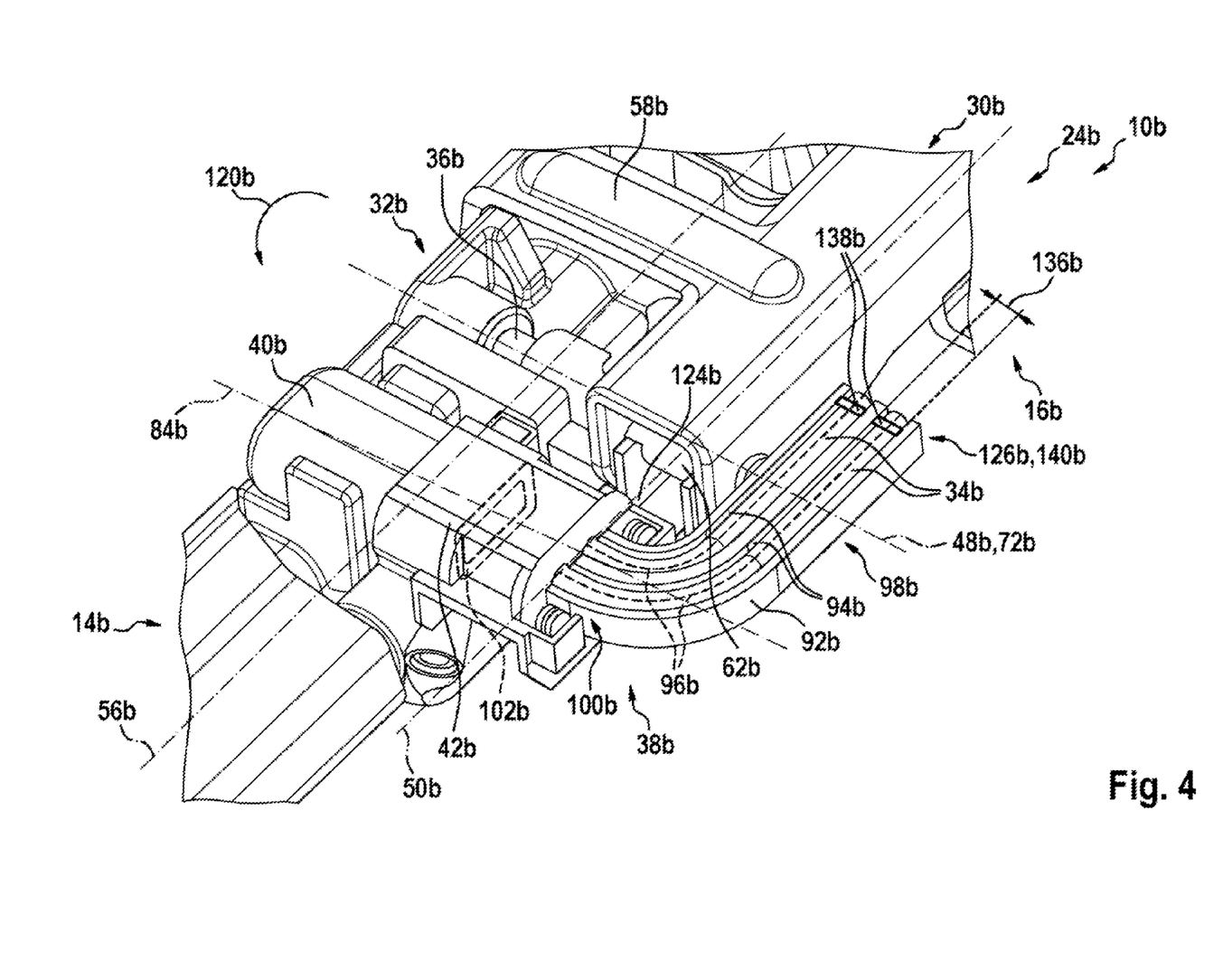
FIG. 4 shows a schematic detailed view of an alternative embodiment of the windshield wiper device according to the invention.

FIG. 4 shows a further exemplary embodiment of the invention. The following descriptions and the drawings are restricted substantially to the differences between the exemplary embodiments, wherein with respect to components designated identically, in particular in respect of components with the same reference signs, reference can basically also be made to the drawings and/or to the description of the other exemplary embodiment, in particular of FIGS. 1 to 3. To differentiate the exemplary embodiments, the letter a has been placed after the reference signs of the exemplary embodiment in FIGS. 1 to 3. In the exemplary embodiment of FIG. 4, the letter a has been replaced by the letter b.

FIG. 4 shows an alternative embodiment of a windshield wiper device 24b of a windshield wiper 10b. The windshield wiper device 24b comprises a wiper blade adapter 32b, a wiper arm adapter 30b and an electric connecting unit 38b for electrically connecting two line elements 34b of the wiper arm adapter 30b to an electric attachment element 40b of the wiper blade adapter 32b. The wiper blade adapter 32b is mounted movably, in particular pivotably, on the wiper arm adapter 30b via a bearing element 36b of the wiper arm adapter 30b, the bearing element being designed in particular as a bearing bolt. The electric connecting unit 38b comprises an electric connecting element 42b which is arranged on the wiper arm adapter 30b and is mounted via the bearing element 36b so as to be movable, in particular rotatable or pivotable, at least relative to the wiper arm adapter 30b. The windshield wiper device 24b illustrated in FIG. 4 has an at least substantially analogous configuration to the windshield wiper device 24a described in the description of FIGS. 1 to 3, and therefore reference can be at least substantially made to the description of FIGS. 1 to 3 in respect of a configuration of the windshield wiper device 24b illustrated in FIG. 4. In contrast to the windshield wiper device 24a described in the description of FIGS. 1 to 3, the windshield wiper device 24b illustrated in FIG. 4 preferably has a receiving element 92b for at least partially receiving the two line elements 34b, wherein, in at least one connected state of the electric connecting unit 38b, the receiving element 92b is arranged on the wiper arm adapter 30b at least via the electric connecting element 42b so as to be movable, in particular pivotable or rotatable. The receiving element 92b is formed integrally with the electric connecting element 42b and a coupling element 62b of the electric connecting unit 38b. The receiving element 92b delimits two receiving recesses 94b formed separately from each other, wherein in each case one of the line elements 34b is at least partially arranged within one of the receiving recesses 94b. The receiving recesses 94b each extend along a guide section 96b of the receiving element 92b. The receiving element 92b is designed in such a manner that the receiving recesses 94b each extend along the guide section 96b of the receiving element 92b as far as the electric connecting element 42b. The receiving element 92b at least largely surrounds the receiving recesses 94a, as viewed in at least one plane of the receiving element 92b oriented at least substantially perpendicularly to the guide section 96b. The receiving element 92b designed in such a manner that the receiving recesses 94b each extend along the guide section 96b over a constant maximum transverse extent 136b oriented in particular at least substantially perpendicular to the guide section 96b. The receiving element 92b is designed in such a manner that the guide section 96b is at least partially curved. The receiving element 92b is designed in such a manner that the guide section 96b, in particular in at least one mounted state of the wiper blade adapter 32b on the wiper arm adapter 30b, extends within a plane oriented at least substantially parallel to a main axis of extent 50b of the wiper arm adapter 30b, to a connecting axis 84b and/or to a bearing axis 48b of the bearing element 36b. The receiving element 92b is designed in such a manner that the guide section 96b, in particular in at least one mounted state of the wiper blade adapter 32b on the wiper arm adapter 30b, is arranged in at least one region 98b at least substantially parallel to the main axis of extent 50b of the wiper arm adapter 30b and is rectilinear. The receiving element 92b is designed in such a manner that, in at least one further region 100b, in particular adjacent to the electric connecting element 42b, the guide section 96b is arranged at least substantially parallel to the connecting axis 84b and/or at least substantially perpendicular to the main axis of extent 50b of the wiper arm adapter 30b and is rectilinear. The electric connecting unit 38b comprises two fixing elements 138b which are arranged on the receiving element 92b. The fixing elements 138b are provided to at least partially fix the line elements 34b relative to the receiving element 92b. The fixing elements 138b are in the form of clamps. However, other embodiments of the fixing elements 138b are also conceivable, for example in the form of hooks, in the form of loops, in the form of shaped components, in particular for constricting the receiving recesses 94b, or the like. The fixing elements 138b are each arranged on one of the receiving recesses 94b. The fixing elements 138b are each at least partially arranged in a wiper-arm-adapter-side end region 126b of the receiving recesses 94b. The fixing elements 138b are particularly preferably at least partially arranged in an end region 140b of the guide section 96b, said end region being opposite the electric connecting element 42b. In comparison to the windshield wiper device 10a described in FIGS. 1 to 3, the windshield wiper device 24b is preferably formed free from a form-fitting element 104a.

What is claimed is:

1. A windshield wiper device having at least one wiper blade adapter (32a; 32b), having at least one wiper arm adapter (30a; 30b) and having at least one electric connecting unit (38a; 38b) for electrically connecting at least one line element (34a; 34b) of the wiper arm adapter (30a; 30b) to at least one electric attachment element (40a; 40b) of the wiper blade adapter (32a; 32b), wherein the wiper blade adapter (32a; 32b) is mounted movably on the wiper arm adapter (30a; 30b) via at least one bearing element (36a; 36b) of the wiper arm adapter (30a; 30b), characterized in that the electric connecting unit (38a; 38b) comprises at least one electric connecting element (42a; 42b) which is arranged on the wiper arm adapter (30a; 30b) and is mounted via the bearing element (36a; 36b) so as to be movable at least relative to the wiper arm adapter (30a; 30b), wherein the electric connecting unit (38a; 38b) comprises at least one coupling element (62a; 62b) which is arranged on the bearing element (36a; 36b) and the electric connecting element (42a; 42b) and delimits at least one bearing recess (64a; 64b), wherein at least the electric connecting element (42a; 42b) and the coupling element (62a; 62b) are mounted on the bearing element (36a; 36b) via the bearing recess (64a; 64b) so as to be movable relative to the wiper arm adapter (30a; 30b).

2. The windshield wiper device as claimed in claim 1, characterized in that the wiper arm adapter (30a; 30b) at least partially surrounds the coupling element (62a; 62b) at least in a region (74a; 74b) of the coupling element (62a; 62b), in which region the coupling element (62a; 62b) delimits the bearing recess (64a; 64b) and is arranged on the bearing element (36a; 36b).

3. The windshield wiper device as claimed in claim 1, characterized in that the electric connecting unit (38a; 38b) has at least one stop element (78a; 78b) which is arranged on the electric connecting element (42a; 42b) and, in at least one connected state of the electric connecting unit (38a; 38b), lies on the wiper arm adapter (30a; 30b), wherein the stop element (78a; 78b) is configured to secure the electric connecting element (42a; 42b) against a movement relative to the wiper arm adapter (30a; 30b) in at least one direction (80a) oriented along a bearing axis (48a; 48b) of the bearing element (36a; 36b).

4. The windshield wiper device as claimed in claim 1, characterized in that the electric connecting unit (38a; 38b) has at least one connecting axis (84a; 84b), along which the electric connecting element (42a; 42b) and the electric attachment element (40a; 40b) are connectable to each other and are separable from each other, wherein the electric connecting element (42a; 42b) is arranged in such a manner that the connecting axis (84a; 84b) is oriented at least substantially parallel to a bearing axis (48a; 48b) of the bearing element (36a; 36b).

5. The windshield wiper device as claimed in claim 1, characterized in that the electric connecting unit (38a; 38b) has, along an axis oriented at least substantially perpendicularly to a main axis of extent (50a; 50b) of the wiper arm adapter (30a; 30b) and to a bearing axis (48a; 48b) of the bearing element (36a; 36b), a maximum distance (88a) of at most 3 cm to a plane of the wiper arm adapter (30a; 30b), which plane includes the bearing axis (48a; 48b) and is oriented at least substantially parallel to the main axis of extent (50a; 50b) of the wiper arm adapter (30a; 30b).

6. The windshield wiper device as claimed in claim 1, characterized in that the electric connecting unit (38a; 38b) comprises at least one receiving element (92a; 92b) for at least partially receiving the line element (34a; 34b), which receiving element, in at least one connected state of the electric connecting unit (38a; 38b), is arranged on the wiper arm adapter (30a; 30b) at least via the electric connecting element (42a; 42b) so as to be movable.

7. The windshield wiper device as claimed in claim 1, characterized in that, in at least one connected state of the electric connecting unit (38a; 38b), the electric connecting element (42a; 42b) and the electric attachment element (40a; 40b) are connected to each other for conjoint rotation with respect to a movement of the wiper blade adapter (32a; 32b) relative to the wiper arm adapter (30a; 30b), wherein the electric connecting unit (38a; 38b) is rotatable or pivotable together with the wiper blade adapter (32a; 32b) about the bearing element (36a; 36b).

8. The windshield wiper device as claimed in claim 1, characterized in that the electric connecting unit (38a; 38b) comprises at least one sealing element (102a) which is configured, in at least one connected state of the electric connecting unit (38a; 38b), to close at least one electrical contact of at least one of the electric connecting element (42a; 42b) or of the electric attachment element (40a; 40b) in an air-tight and/or waterproof manner.

9. The windshield wiper device as claimed in claim 1, characterized in that the electric connecting unit (38a; 38b) comprises at least one form-fitting element (104a) which lies on at least one contact surface (106a) of the wiper blade adapter (32a), said contact surface being oriented at least substantially parallel to a connecting axis (84a) of the electric connecting unit (38a) and to a main axis of extent (56a) of the wiper blade adapter (32a), and is configured to limit at least a movement of the electric connecting element (42a) about a bearing axis (48a) of the bearing element (36a) during connection of the electric connecting unit (38a) to the electric attachment element (40a).

10. A windshield wiper having at least one windshield wiper device (24a; 24b) as claimed in claim 1.

11. A windshield wiper device having at least one wiper blade adapter (32a; 32b), having at least one wiper arm adapter (30a; 30b) and having at least one electric connecting unit (38a; 38b) for electrically connecting at least one line element (34a; 34b) of the wiper arm adapter (30a; 30b) to at least one electric attachment element (40a; 40b) of the wiper blade adapter (32a; 32b), wherein the bearing element (36a, 36b) is a bearing bolt, wherein the wiper blade adapter (32a; 32b) is mounted pivotably on the wiper arm adapter (30a; 30b) via the bearing bolt of the wiper arm adapter (30a; 30b), characterized in that the electric connecting unit (38a; 38b) comprises at least one electric connecting element (42a; 42b) which is arranged on the wiper arm adapter (30a; 30b) and is mounted via the bearing bolt so as to be rotatable or pivotable at least relative to the wiper arm adapter (30a; 30b), wherein the electric connecting unit (38a, 38b) comprises at least one coupling element (62a, 62b) which is arranged directly on the at least one bearing bolt and the electric connecting element (42a, 42b) and delimits at least one bearing recess (64a, 64b), wherein at least the electric connecting element (42a, 42b) and the coupling element (62a, 62b) are mounted on the at least one bearing bolt via the bearing recess (64a, 64b) so as to be rotatable or pivotable relative to the wiper arm adapter (30a, 30b).

12. The windshield wiper device as claimed in claim 11, characterized in that the wiper arm adapter (30a; 30b) at least partially surrounds the coupling element (62a; 62b) at least in a region (74a; 74b) of the coupling element (62a; 62b), in which region the coupling element (62a; 62b) delimits the bearing recess (64a; 64b) and is arranged on the at least one bearing bolt.

13. The windshield wiper device as claimed in claim 12, characterized in that the electric connecting unit (38a; 38b) has at least one stop element (78a; 78b) which is arranged on the electric connecting element (42a; 42b) and, in at least one connected state of the electric connecting unit (38a; 38b), lies directly on the wiper arm adapter (30a; 30b), wherein the stop element (78a; 78b) is configured to secure the electric connecting element (42a; 42b) against a movement relative to the wiper arm adapter (30a; 30b) in at least one direction (80a) oriented along a bearing axis (48a; 48b) of the at least one bearing bolt.

14. The windshield wiper device as claimed in claim 13, characterized in that the electric connecting unit (38a; 38b) has at least one connecting axis (84a; 84b), along which the electric connecting element (42a; 42b) and the electric attachment element (40a; 40b) are connectable to each other and are separable from each other, wherein the electric connecting element (42a; 42b), in at least one connected state of the electric connecting unit (38a; 38b), is arranged in such a manner that the connecting axis (84a; 84b) is oriented at least substantially parallel to a bearing axis (48a; 48b) of the at least one bearing bolt.

15. The windshield wiper device as claimed in claim 14, characterized in that the electric connecting element (42a; 42b) has, along an axis oriented at least substantially perpendicularly to a main axis of extent (50a; 50b) of the wiper arm adapter (30a; 30b) and to a bearing axis (48a; 48b) of the at least one bearing bolt, a maximum distance (88a) of at most 3 cm to a plane of the wiper arm adapter (30a; 30b), which plane includes the bearing axis (48a; 48b) and is oriented at least substantially parallel to the main axis of extent (50a; 50b) of the wiper arm adapter (30a; 30b).

16. The windshield wiper device as claimed in claim 15, characterized in that the electric connecting unit (38a; 38b) comprises at least one receiving element (92a; 92b) for at least partially receiving the line element (34a; 34b), which receiving element, in at least one connected state of the electric connecting unit (38a; 38b), is arranged on the wiper arm adapter (30a; 30b) at least via the electric connecting element (42a; 42b) so as to be pivotable or rotatable.

17. A windshield wiper device having at least one wiper blade adapter (32a; 32b), having at least one wiper arm adapter (30*a*; 30*b*) and having at least one electric connecting unit (38*a*; 38*b*) for electrically connecting at least one line element (34*a*; 34*b*) of the wiper arm adapter (30*a*; 30*b*) to at least one electric attachment element (40*a*; 40*b*) of the wiper blade adapter (32*a*; 32*b*), wherein the wiper blade adapter (32*a*; 32*b*) is mounted movably on the wiper arm adapter (30*a*; 30*b*) via at least one bearing element (36*a*; 36*b*) of the wiper arm adapter (30*a*; 30*b*), characterized in that the electric connecting unit (38*a*; 38*b*) comprises at least one electric connecting element (42*a*; 42*b*) which is arranged on the wiper arm adapter (30*a*; 30*b*) and is mounted via the bearing element (36*a*; 36*b*) so as to be movable at least relative to the wiper arm adapter (30*a*; 30*b*), wherein the electric connecting unit (38*a*; 38*b*) has, along an axis oriented at least substantially perpendicularly to a main axis of extent (50*a*; 50*b*) of the wiper arm adapter (30*a*; 30*b*) and to a bearing axis (48*a*; 48*b*) of the bearing element (36*a*; 36*b*), a maximum distance (88*a*) of at most 3 cm to a plane of the wiper arm adapter (30*a*; 30*b*), which plane includes the bearing axis (48*a*; 48*b*) and is oriented at least substantially parallel to the main axis of extent (50*a*; 50*b*) of the wiper arm adapter (30*a*; 30*b*).

\* \* \* \* \*